(12) United States Patent
Halaharivi

(10) Patent No.: US 9,990,138 B2
(45) Date of Patent: Jun. 5, 2018

(54) OUT OF ORDER SGL READ SORTING IN A MIXED SYSTEM WITH PRP READ OR SYSTEM THAT SUPPORTS ONLY SGL READS

(71) Applicant: Toshiba Memory Corporation, Tokyo (JP)

(72) Inventor: Raja V. S. Halaharivi, San Jose, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 317 days.

(21) Appl. No.: 14/675,539

(22) Filed: Mar. 31, 2015

(65) Prior Publication Data

US 2016/0291868 A1 Oct. 6, 2016

(51) Int. Cl.
*G06F 3/06* (2006.01)
*G06F 12/02* (2006.01)

(52) U.S. Cl.
CPC ............ *G06F 3/061* (2013.01); *G06F 3/0659* (2013.01); *G06F 3/0679* (2013.01); *G06F 12/02* (2013.01)

(58) Field of Classification Search
None
See application file for complete search history.

(56) References Cited

U.S. PATENT DOCUMENTS

| 6,134,638 | A | * | 10/2000 | Olarig | ................. G06F 13/1694 710/112 |
| 6,148,365 | A | * | 11/2000 | Buer | .......................... G06F 5/10 710/53 |
| 7,228,362 | B2 | | 6/2007 | Jen et al. | |
| 7,991,968 | B1 | | 8/2011 | Mizrahi | |
| 2005/0091460 | A1 | | 4/2005 | Rotithor et al. | |
| 2005/0223123 | A1 | | 10/2005 | Jen et al. | |
| 2006/0215481 | A1 | * | 9/2006 | Dally | .................... G11C 7/1006 365/233.5 |
| 2015/0127882 | A1 | * | 5/2015 | Carlson | ............... G06F 12/0246 711/103 |

OTHER PUBLICATIONS

U.S. Appl. No. 14/674,796, filed Mar. 31, 2015.

* cited by examiner

*Primary Examiner* — Daniel D Tsui
(74) *Attorney, Agent, or Firm* — Patterson & Sheridan LLP

(57) ABSTRACT

A data storage device includes a non-volatile semiconductor storage device and a controller that is configured to issue first and second read requests in that order, to read data from the non-volatile semiconductor storage device, in response to receiving a read command, and store read responses to the first and second read requests in a queue in the order they are received. The queue is a circular buffer having a write pointer, a read pointer, and a special read pointer associated therewith, the write pointer being advanced each time contents are written into the buffer, the read pointer being advanced when oldest valid contents in the buffer are read, and the special read pointer being advanced when valid contents in the buffer, excluding the oldest valid contents, are read. As a result, instead of sorting read responses associated with the read command prior to storing them in the queue, the read responses are stored in the queue in the order they are received.

19 Claims, 6 Drawing Sheets

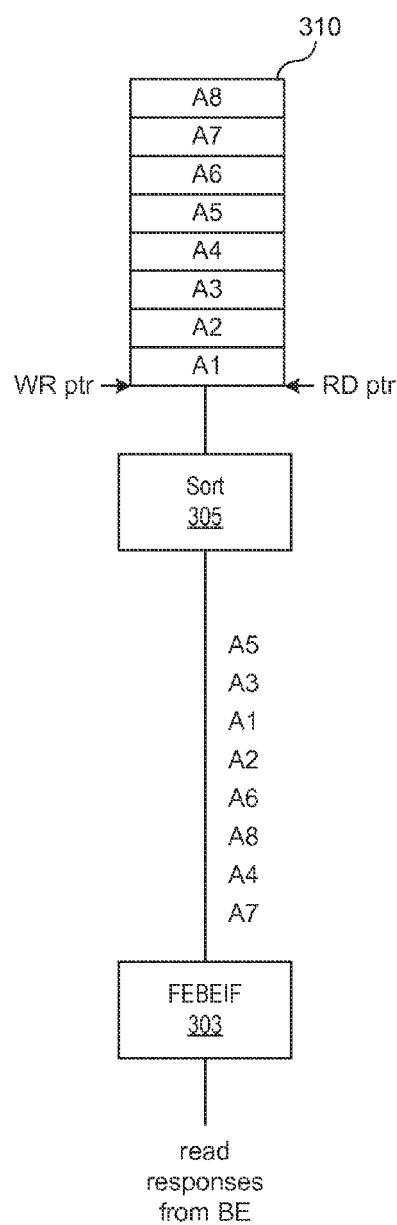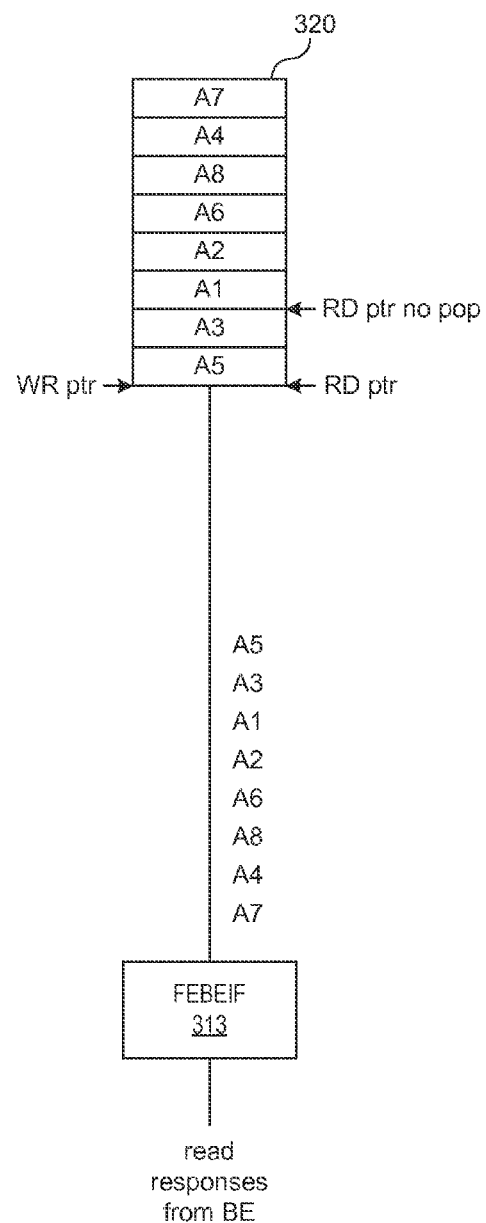
FIGURE 3A
FIGURE 3B

OUT OF ORDER SGL READ SORTING IN A MIXED SYSTEM WITH PRP READ OR SYSTEM THAT SUPPORTS ONLY SGL READS

BACKGROUND

Solid-state drives (SSDs) generally have faster performance, are more compact, and are less sensitive to vibration or physical shock than conventional magnetic disk drives. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

The performance of SSDs is not attributable only to the speed of reading from and writing to memory cells of SSDs but also the time taken by the SSD controller to process the read and write commands issued by connected host systems. From the perspective of the host system, IO (input-output operation) latency is measured by the time it issues the read or write command to the SSD to the time the SSD responds with read data or a write acknowledgement. If there any delays between those two time periods, including delays attributable to the SSD controller, the host system will experience an increase in latency.

Efforts have been made to decrease IO latencies attributable to the SSD controller design. For example, instead of employing a single port for receiving host commands, many SSD host interface circuits may employ two or more of such ports. Higher speeds may also be achieved with larger size dynamic random access memory (DRAM) that is used in caching reads and writes. However, making the DRAM larger has the drawback of increasing the overall cost of the SSD.

SUMMARY

One or more embodiments provide an SSD controller that reduces read latency when executing certain type of read commands, e.g., SGL (scatter gather list) read commands, that require read data to be returned in order to a host system. In the embodiments, instead of sorting read responses associated with a read command prior to storing them in a first-in, first out (FIFO) queue, the read responses are stored in a modified FIFO queue in the order they are received. The modified FIFO queue employs a special read pointer that permits contents to be read from a location in the queue without making that location available for a new write, i.e., without popping out the contents from the queue.

A data storage device, according to an embodiment, includes a non-volatile semiconductor storage device and a controller that is configured to issue first and second read requests in that order, to read data from the non-volatile semiconductor storage device, in response to receiving a read command, and store read responses to the first and second read requests in a queue in the order they are received. The queue is a circular buffer having a write pointer, a read pointer, and a special read pointer associated therewith, the write pointer being advanced each time contents are written into the buffer, the read pointer being advanced when oldest valid contents in the buffer are read, and the special read pointer being advanced when valid contents in the buffer, excluding the oldest valid contents, are read.

BRIEF DESCRIPTION OF THE DRAWINGS

FIG. 3A is a conceptual diagram of read responses being stored in a queue according to a conventional technique.

FIG. 3B is a conceptual diagram of read responses being stored in a queue according to embodiments.

DETAILED DESCRIPTION

Figure 1:
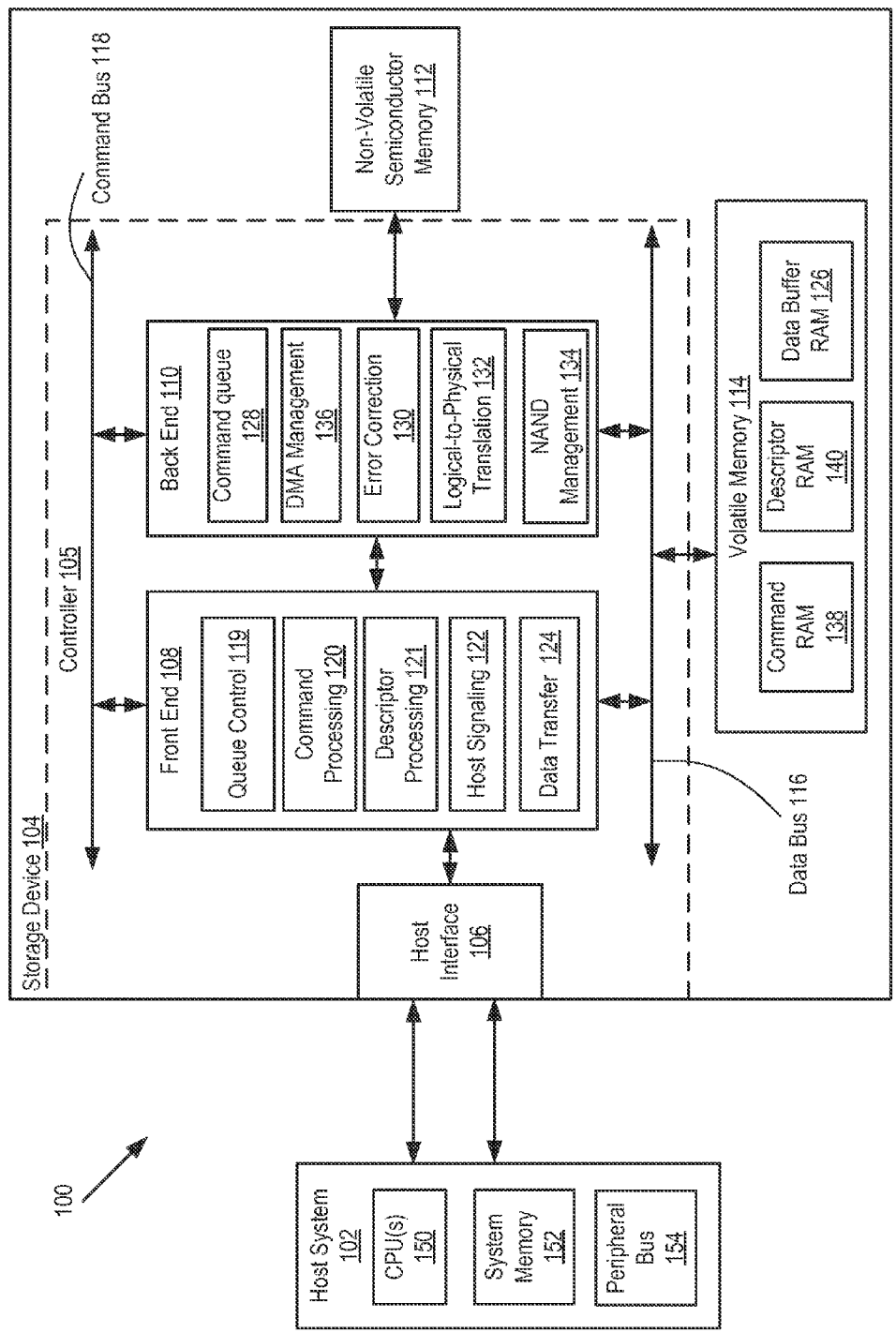
FIG. 1 is a block diagram of a solid-state drive (SSD) configured with a controller according to one or more embodiments.

FIG. 1 is a block diagram showing an example of a computing system 100 including a storage device 104 in communication with a host system 102. Host system 102 is a computing system that comprises one or more central processor units (CPUs) 150, a system memory 152, a peripheral bus 154, and other components as is generally known. CPUs 150 can include any type of microprocessor(s) known in the art. System memory 152 may include, for example, random access memory (RAM), read only memory (ROM), or a combination thereof. Peripheral bus 154 can be any type of computer bus interface, such as a peripheral component interconnect express (PCIe) bus, serial advanced technology attachment (SATA) bus, or the like. Storage device 104 provides non-volatile storage functionality for use by host system 102. Storage device 104 can be a solid-state drive ("SSD"), which is a non-volatile storage device that includes non-volatile semiconductor-based storage elements, such as NAND-based flash memory, as the storage medium (as opposed to, for example, the magnetic medium used in hard disk drives).

Storage device 104 includes an SSD controller 105, volatile memory 114, and non-volatile semiconductor memory 112. Storage device 104 may also include other elements not shown, such as power supply circuitry (including circuitry for transferring power to the SSD controller 105, volatile memory 114, and non-volatile semiconductor memory 112, as well as capacitors for buffering the power supply), indicator light circuitry, temperature sensors, boot circuitry, clock circuitry, and other circuitry for assisting with various functions.

SSD controller 105 receives and processes commands from host system 102 in order to perform operations on the non-volatile semiconductor memory 112. Commands from host system 102 include requests to read or write to locations within the non-volatile semiconductor memory 112, and various administrative commands, such as commands for querying the feature set of storage device 104, commands for formatting non-volatile memory 112, commands for creating and modifying various types of queues, commands for requesting notification of various events, and various other commands. SSD controller 105 includes a host interface 106, a front end 108, a back end 110, a command bus 118, and a data bus 116.

Host interface 106 comprises circuitry for communicating with host system 102. In one embodiment, host interface 106 is coupled to peripheral bus 154 in host system 102 through one or more ports (e.g., two ports are shown). For example, host interface 106 can be a PCIe interface that communicates according to the PCIe standard, and SSD controller 105 can comply with the non-volatile memory host controller interface specification (NVMHCI) referred to as "NVM express" or "NVMe." In other embodiments, the interface is a SATA interface or a SAS interface.

Front end 108 communicates with host system 102 to receive, organize, and forward commands from host system 102 to back end 110. Front end 108 also forwards status data from back end 110 to host system 102. Back end 110 performs tasks associated with commands received from front end 108, accessing non-volatile semiconductor memory 112 as needed in accordance with these tasks. Back end 110 employs direct memory access (DMA) to store and retrieve data from system memory 152 of host system 102. For example, back end 110 can transfer data that has been read from non-volatile semiconductor memory 112 to system memory 152 using DMA. Back end 110 can transfer data to be written to non-volatile semiconductor memory 112 from system memory 152 using DMA.

Both front end 108 and back end 110 are coupled to a command bus 118 and a data bus 116. Command bus 118 functions to transfer command-related data between various sub-units of front end 108 and back end 110, and data bus 116 serves to transfer data between volatile memory 114 and various sub-units of front end 108 and back end 110. Volatile memory 114 can include one or more types of RAM, such as static RAM (SRAM), dynamic RAM (DRAM), or the like.

Volatile memory 114 can include RAM modules or specific regions of RAM dedicated to storing particular types of data. In an embodiment, volatile memory 114 includes command RAM 138 configured to store commands received from host system 102, descriptor RAM 140 configured to store DMA descriptors received from host system 102. Data buffer RAM 126 configures a read cache and a write cache. A read cache temporarily stores data read from non-volatile semiconductor memory 112 ("read data") in response to a command from host system 102. A write cache temporarily stores data to be written to non-volatile semiconductor memory 112 ("write data") in response to a command from host system 102.

While command RAM 138, descriptor RAM 140, and data buffer RAM 126 are shown as being part of a single group of volatile memory coupled to data bus 116, other configurations are possible. For example, command RAM 138 and descriptor RAM 140 can be part of a group of volatile memory only coupled to front end 108, and data buffer RAM 126 can be part of a group of volatile memory only coupled to back end 110. In such an example, front end 108 can forward command and descriptor data to back end 110 over a bus (e.g., command bus 118 or data bus 116) or by a direct link to back end 110, rather than back end 110 having direct access to command and descriptor data in volatile memory 114.

Non-volatile semiconductor memory 112 stores data in a non-volatile manner at the request of host system 102. Non-volatile semiconductor memory 112 includes one or more arrays of non-volatile semiconductor-based storage elements, some examples of which include non-volatile NAND flash memory, non-volatile NOR flash memory, non-volatile DRAM based memory, magnetoresistive random-access memory (MRAM), and other types of memory. As NAND-based flash memory is commonly used as the non-volatile semiconductor memory 112, non-volatile semiconductor memory 112 may be referred to herein as NAND memory 112 or simply as NAND 112.

Front end 108 includes multiple functional units, including queuing control unit 119, command processing unit 120, descriptor processing unit 121, host signaling unit 122, and data transfer unit 124. Command processing unit 120 fetches commands issued by host system 102. Command processing unit 120 provides the commands to queuing control unit 119. Queuing control unit 119 stores the commands in command RAM 138. Queuing control unit 119 implements command load balancing to select eligible commands to be performed by back end 110. Command processing unit 120 forwards commands selected by queuing control unit 119 to back end 110 for processing. Command processing unit 120 can also perform various operations on commands, such as command checks. Command processing unit 120 also receives status information for the commands from back end 110. Descriptor processing unit 121 fetches DMA descriptors from host system 102 associated with the commands. For example, the DMA descriptors point to write and read buffers in system memory 152 for write and read commands. Descriptor processing unit 121 stores received descriptors for the commands in descriptor RAM 140.

Host signaling unit 122 can transmit command status information obtained from command processing unit 120 to host system 102. Host signaling unit 122 generates host notification signals and transmits these signals to host system 102. These signals may be used to indicate that one or more commands submitted by host system 102 are complete. Host notification signals include interrupts and may be out-of-band, pin-based interrupts, or may be in-band message signaled interrupts ("MSI" or "MSIx"). The interrupts include data identifying the command that has been completed as well as status data associated with that command. Host signaling unit 122 includes an interrupt table that includes such information, as well as an interrupt generator which generates interrupts for transmission to host system 102, based on the information stored in the interrupt table.

Host system 102 can maintain various command queues in system memory 152 (not shown), such as submission queues and completion queues. Submission queues store commands sent to SSD controller 105, and completion queues store information about commands completed by SSD controller 105. Host system 102 also maintains write data buffers and read data buffers (not shown) in system memory 152. Host system 102 also maintains DMA descriptors (not shown) associated with the write and read data buffers in system memory 152.

Data transfer unit 124 serves as an intermediary between host interface 106 and the sub-units of front end 108 (e.g., queue control unit 119, command processing unit 120, and descriptor processing unit 121). Data transfer unit 124 directs data received from host interface 106 to the appropriate sub-unit (e.g., command data to command processing unit 120 and descriptor data to descriptor processing unit 121).

Back end 110 includes multiple functional units, including a command queue 128, an error correction unit 130, a logical-to-physical address translation unit 132, a NAND management unit 134, and DMA management unit 136. Command queue 128 stores commands received from front end 108 for further processing. Buffering commands in this manner allows back end 110 to process received commands based on a particular schedule or on specific timing or state-based constraints. Error correction unit 130 provides error correction functionality for data stored in non-volatile semiconductor memory 112. Error correction unit 130 generates error-correction data for data written to the non-volatile semiconductor memory 112 and stores the error-correction data with the written data. When the written data is read out and error in reading is encountered, error correction unit 130 performs error correction operations using the error-correction data.

Logical-to-physical translation unit 132 translates logical addresses, e.g., logical block addresses (LBAs), to physical addresses, e.g., physical block addresses, of non-volatile semiconductor memory 112 during reading or writing data. Logical-to-physical translation unit 132 accesses a map, known as a flash translation layer (FTL), when converting logical addresses to physical addresses so that data requested by host system 102 with a logical address can be properly physically addressed within non-volatile semiconductor memory 112.

NAND management unit 134 is configured to write data to non-volatile semiconductor memory 112 and read data from non-volatile semiconductor memory 112. NAND management unit 134 stores data read from non-volatile semiconductor memory 112 in a read cache in data buffer RAM 126. NAND management unit 134 receives data to be written to non-volatile semiconductor memory 112 from a write cache in data buffer RAM 126. NAND management unit 134 may also provide other functions, such as wear leveling, bad block mapping, garbage collection, and read scrubbing.

Wear leveling is a technique to compensate for the fact that a (relatively) limited number of write operations can be performed on each NAND data storage element, commonly referred to as a block. Wear leveling comprises periodically moving data between NAND data storage blocks in order to even out or "level" the number of times write operations are performed for each data storage block. Bad block mapping is a technique for marking blocks as being "bad" after it is discovered that such blocks are unreliable. Blocks marked as bad are not written to or read from.

Garbage collection is a technique whereby valid pages (a subunit of a block) within a block are copied to a new block so that the source block can be erased. Garbage collection is needed in NAND memory because the unit of writing is a page and the unit of erasure is a block. Accordingly, if a command to write data targets an existing page, then the data of the existing page is not actually modified. Instead, a new page is written and the old page is marked as invalid. As a result, the number of invalid pages continues to grow and garbage collection becomes necessary to free up blocks having a large number of invalid pages.

Read scrubbing is a technique whereby SSD controller 105 periodically reads data in the non-volatile semiconductor memory 112, performs error checking operations on the data to determine if there are errors, corrects errors that are found, and then writes the error-corrected data back to the same location. This technique helps to reduce the amount of errors experienced when reading data out from the non-volatile semiconductor memory 112.

DMA management unit 136 is configured to control DMA transfer of data between SSD controller 105 and system memory 152 in host system 102. DMA management unit 136 uses DMA descriptors obtained by front end 108, which point to read and write buffers in system memory 152. DMA management unit 136 transfers data from a read cache in data buffer RAM 126 to system memory 152 using corresponding DMA descriptors associated with a corresponding read command. DMA management unit 136 transfers data to write cache in data buffer RAM 126 from system memory 152 using corresponding DMA descriptors associated with a corresponding write command.

In various embodiments, the functional blocks included in front end 108 and back end 110 represent hardware or combined software and hardware elements for performing associated functionality. Thus, any or all of the functional blocks may be embodied as firmware executing in a processing unit, as hardware units that are hard-wired to perform the associated functionality, or as a combination thereof. For example, either or both of front end 108 or back end 110 may include one or more processors, one or more state machines, one or more application specific integrated circuits (ASICs), one or more programmable integrated circuits, or the like, that are programmed or configured to perform functions related to the functional blocks. Alternatively, a single processor may be shared between and thus may perform the functions of both front end 108 and back end 110.

Certain functional blocks and functionality associated therewith that are depicted as being included within front end 108 or back end 110 may be implemented as data structures stored within volatile memory 114. Thus, for example, queues indicated as being included in front end 108 and back end 110, may be stored within volatile memory 114. While specific functional units are shown in front end 108 and back end 110, other configurations of functional units can be used to implement the functionality described herein. In general, front end 108 and back end 110 can include one or more functional units that perform the functionality described herein.

In various examples described herein, front end 108 and functions thereof are described as being part of SSD controller 105 in storage device 104. In another embodiment, front end 108 can be separate from SSD controller 105 and/or separate from storage device 104. For example, front end 108 can be part of a controller external to storage device 104. In another embodiment, front end 108 can be implemented by host system 102. For example, the functions performed by front end 108 described above can be implemented in software executed by CPUs 150 in host system 102. Command RAM 138 and descriptor RAM 140 can be part of system memory 152. In such an embodiment, front end 108 is omitted from SSD controller 105 in storage device 104. In still another embodiment, functions of front end 108 can be divided between host system 102 and controller 105 in storage device 104.

Figure 2:
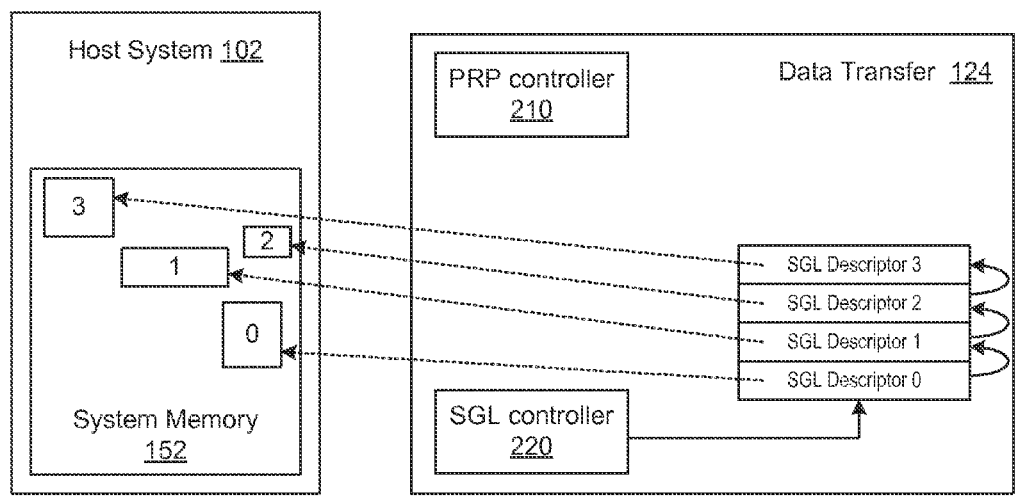
FIG. 2 is a conceptual diagram of mapping of command descriptor stored in a queue of a data transfer unit of the controller shown in FIG. 1 to host memory locations.

FIG. 2 is a diagram that illustrates a data transfer unit 124 of SSD controller 105 of FIG. 1 in further detail. For reads, data transfer unit 124 directs data stored in read cache of volatile memory 114 at the direction of back end for later transmission to host system 102 via host interface 106. For writes, data transfer unit 124 directs data received from host interface 106 to be stored in write cache of volatile memory 114 for later retrieval at the direction of back end 110. For both reads and writes, the data transfer method is designated in the command. In the embodiments described herein, the data transfer method is either PRP (physical region page) or SGL (scatter gather list) and the data transfer method is specified in the read or write command received by SSD controller 105. The command also includes a descriptor that specifies a location in the system memory of host system 102 where data read from non-volatile semiconductor memory 112 is to be stored or where data to be written into non-volatile semiconductor memory 112 is stored. For executing the PRP data transfer, a PRP controller 210 is provided in data transfer unit 124. For executing the SGL data transfer, an SGL controller 220 is provided in data transfer unit 124.

Embodiments are directed to SGL reads and mixed SGL/PRP reads, and thus a description of SGL and PRP writes are omitted herein. An SGL read command that is received through host interface 106 and processed by command processing unit 120 includes a single SGL descriptor that specifies a location in system memory 152 of host system 102 where data read from non-volatile semiconductor memory 112 is to be stored. Additional SGL descriptors may be associated with the read command in a linked-list and may be pre-fetched in accordance with the techniques described in U.S. patent application Ser. No. 14/674,796, which is concurrently filed herewith and incorporated by reference herein in its entirety. In the example shown in FIG. 2, four separate regions of system memory 152 of host system 102 are specified in four SGL descriptors.

In the embodiments, before data is actually read from non-volatile semiconductor memory 112, the SGL read command received through host interface 106 is processed in command processing unit 120. If the read size is greater than a unit of reading, which is typically equal to (but not limited to) a cluster read size, e.g., 4 KB, multiple read requests are issued and interleaved with read requests from other read commands, if any are being processed by command processing unit 120 at the same time. For various reasons that are well understood in the art, read requests may not necessarily complete in the same order they were issued. However, the data transfer carried out by SGL controller 220 relies on a linked list of SGL descriptors and, in general, read responses that are returned out-of-order needs to be sorted prior to being queued.

FIGS. 3A and 3B are conceptual diagrams that illustrate the handling of out-of-order read responses. FIG. 3A illustrates a conventional technique and FIG. 3B illustrates a technique according to embodiments. In both examples, A# represents read responses to read requests returned from back end 110, where the symbol # represents the numerical order in which the read requests were issued by command processing unit 120 to back end 110. Accordingly, A1 is the read response to a read request issued first in time, A2 to a read request issued second in time, and so forth. To simplify the description, it is assumed that only eight read requests are being processed for a single SGL read command. In addition, for illustrative purposes, the read responses are returned out of order in relation to the read requests that were issued. The same out-of-order read responses are shown in FIGS. 3A and 3B so that differences in the two techniques can be highlighted more easily.

In the conventional technique of FIG. 3A, read responses are returned through FEBEIF (front end/back end interface) 303 in the order A5, A3, A1, A2, A6, A8, A4, and A7. Before the read responses are stored in a first-in, first-out (FIFO) buffer 310, a sort unit 305 performs a sorting of the read responses before they are stored in FIFO buffer 310. By contrast, in the technique according to embodiments shown in FIG. 3B, read responses that are returned through FEBEIF 313 out-of-order are not sorted prior to being stored in a buffer 320. Buffer 320 is a modified FIFO, circular buffer with three pointers. Buffer 320 includes a write pointer (WR ptr) and a read pointer (RD ptr) as in FIFO buffer 310, and valid contents of buffer 320 are at locations of buffer 320 between the read pointer and the write pointer. In addition to the read pointer and the write pointer, buffer 320 includes a special read pointer, RD ptr no pop. When the contents of buffer 320 are read by data transfer unit 124, the special read pointer is advanced but does not cause the read contents of buffer 320 to be popped out (removed), i.e., the read pointer is not advanced (moved upwards in FIG. 3B). Consequently, even when the read responses are stored out-of-order in buffer 320, they can be processed in order using this special pointer. Accordingly, embodiments permit storing of read responses out-of-order in buffer 320.

Figure 4:
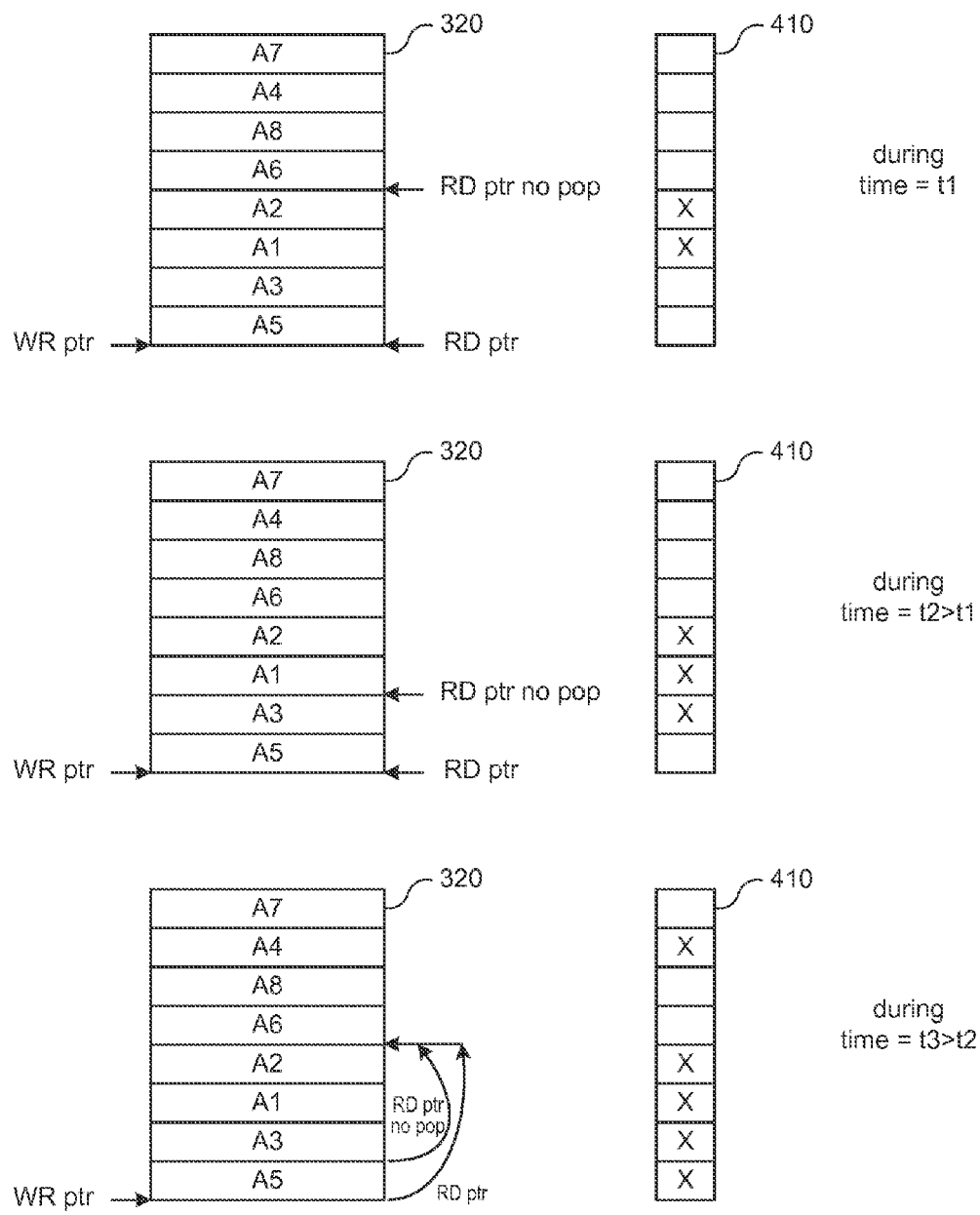
FIG. 4 is a conceptual diagram illustrating steps of reading out read responses from a queue, according to embodiments.

In addition to dispensing with the sorting requirement, embodiments also free up the space in the read response buffer quicker than in the conventional technique. This method is illustrated in FIG. 4 which depicts the state of buffer 320 and the state of a register array 410, which is maintained to track whether or not the contents of buffer 320 have been read, at three different points in time, t1, t2, and t3.

At time t1, buffer 320 is shown to be full and thus the write pointer and the read pointer are pointing to the bottom of buffer 320. In addition, the state of buffer 320 and the state of register array 410 show that data transfer unit 124 has read A1 and A2 from buffer 320. As a result, the special read pointer for reading with no pop has been advanced (upward in FIG. 4) just past the buffer location for A2. In addition, the registers in register array 410 corresponding to the buffer locations in which A1 and A2 are stored are marked. The presence of a mark, which may be a bit set to 1, indicates that the corresponding buffer location has been read. The absence of a mark, which may be a bit set to 0, indicates that the corresponding buffer location has not been read. It should be noted that the read pointer cannot be advanced because A5 and A3 have not yet been read.

At time t2, which is later in time than t1, the special read pointer is at a position just past the buffer location for A3, meaning that it advanced to the top of buffer 320 and wrapped around to the bottom of buffer 320 before stopping at the position shown. The state of buffer 320 and the state of register array 410 at time t2 also show that data transfer unit 124 has read A3, in addition to A1 and A2, from buffer 320.

At time t3, which is later in time than t2, the special read pointer is at a position just past the buffer location for A5, meaning that it advanced to the top of buffer 320 once more and wrapped around to the bottom of buffer 320 before stopping at the position shown. The state of buffer 320 and the state of register array 410 at time t2 also show that data transfer unit 124 has read A4 and A5, in addition to A1, A2, and A3, from buffer 320.

As soon as A5 is read from its location in buffer 320, the read pointer may be advanced in a synchronous manner. According to embodiments, when data transfer unit 124 reads A5 from its location in buffer 320, it examines register array 410 to determine if the read pointer can be advanced by more than one buffer location. In the example given herein, data transfer unit 124 will detect that registers in register array 410 corresponding to buffer locations above the buffer location for A5 have also been read and will advance the read pointer just past the buffer location for A2, which is the last buffer location from the bottom of buffer 320 that has a read mark stored in the corresponding register in register array 410. The special read pointer is also advanced just past the buffer location for A2, because the buffer locations for A2 and below have already been read. Consequently, multiple locations in buffer 320 are freed synchronously and in conjunction with a single read performed on buffer 320.

The embodiments are described above with only a single SGL read command being executed. In other embodiments, a PRP read command may be mixed in with an SGL read command.

Figure 5:
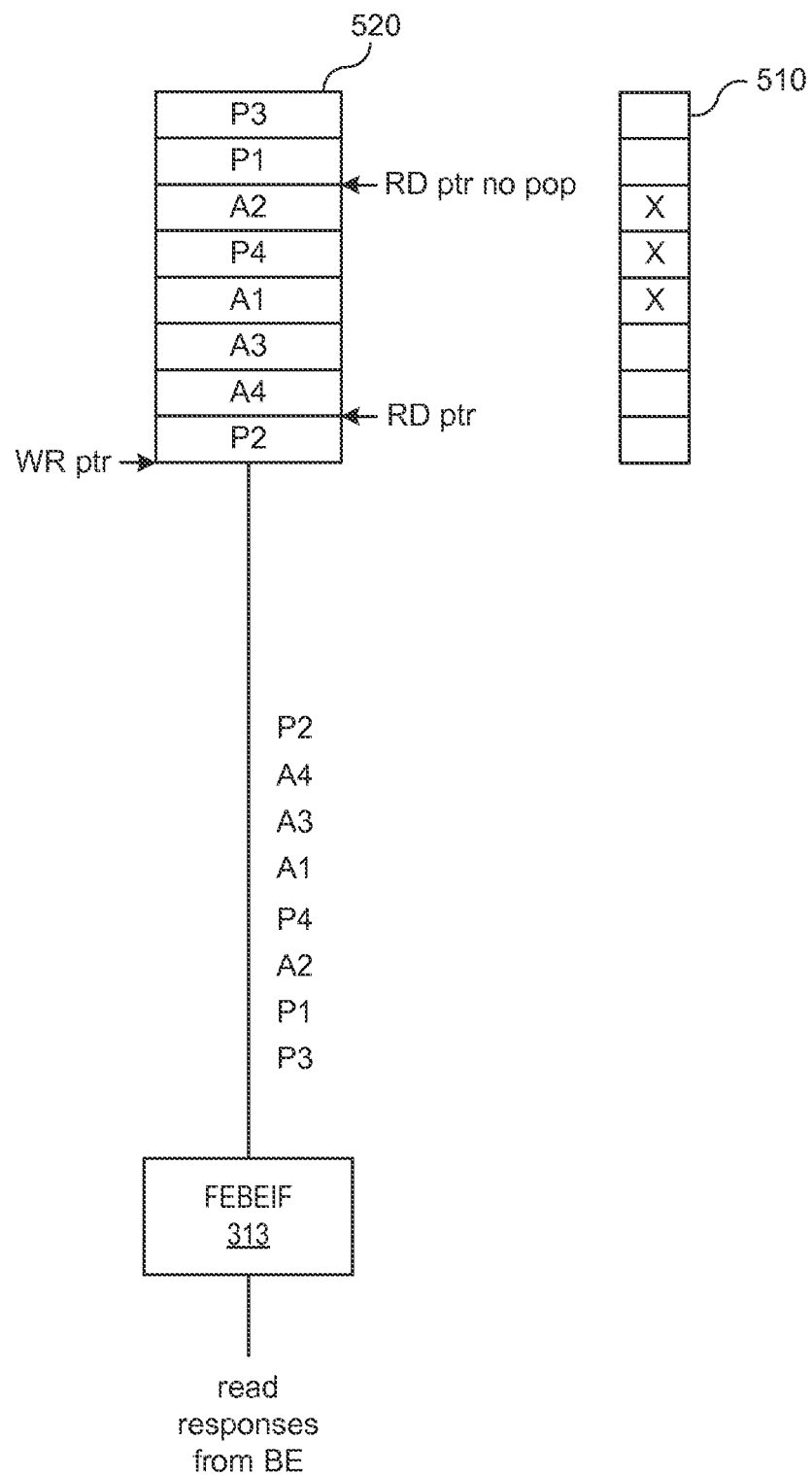
FIG. 5 is a conceptual diagram of read responses being distributed between two queues according to embodiments.

FIG. 5 is a conceptual diagram of mixed read responses being stored in a single buffer 520. Buffer 520 is a modified FIFO, circular buffer with three pointers, and is configured just like buffer 320. A register array 510 is maintained to track whether or not the contents of buffer 520 have been read. Buffer 520 differs from buffer 320 in that the read responses that are stored therein include SGL read responses (A1, A2, A3, A4) and PRP read responses (P1, P2, P3, P4). An SGL read response and a PRP read response are distinguished based on a data tag that is returned with the read response. The data tag is initially assigned by command processing unit 120 when read requests are generated from received SGL or PRP read commands, such that a read response having a data tag that is assigned by command processing unit 120 when issuing a read request for a received SGL read command, would be an SGL read response, and read response having a data tag that is assigned by command processing unit 120 when issuing a read request for a received PRP read command, would be a PRP read response.

In the example given in FIG. 5, the PRP read response is the first read response stored in buffer 520 and is read by data transfer unit 124. The read pointer is advanced because out-of-order reads are permitted for a PRP read response and P2 is the oldest valid content added to buffer 520. The next read response is A4. A4 is an out-of-order SGL read response and is thus not read. As the special read pointer is advanced (upwards in FIG. 5), A1 is read, then P4, and then A2. The read pointer cannot be advanced because A4, representing the oldest valid content add to buffer 520, has not yet been read. Accordingly, instead of advancing the read pointer, the registers in register array 510 corresponding to the buffer locations in which A1, P4, and A2 are stored, are marked. It should be recognized that when the special read pointer advances to the top of buffer 520, P1 and P3 would also be read and corresponding registers of register array 510 marked. However, the read pointer cannot be advanced until A3 is read out after the special read pointer wraps around to the bottom of buffer 520 and then A5 is read out after the special read pointer wraps around to the bottom of buffer 520 one more time.

The data tag for a read request also determines the location in the read cache configured in volatile memory 114 where the read data is stored. Accordingly, for SGL reads, SGL controller 220 of data transfer unit 124 initiates a DMA transfer of the read data from a location in the read cache corresponding to the data tag into a location in the host system memory as specified in an SGL descriptor. Similarly, for PRP reads, PRP controller 210 of data transfer unit 124 initiates a DMA transfer of the read data from a location in the read cache corresponding to the data tag into a location in the host system memory as specified in a PRP descriptor.

Figure 6:
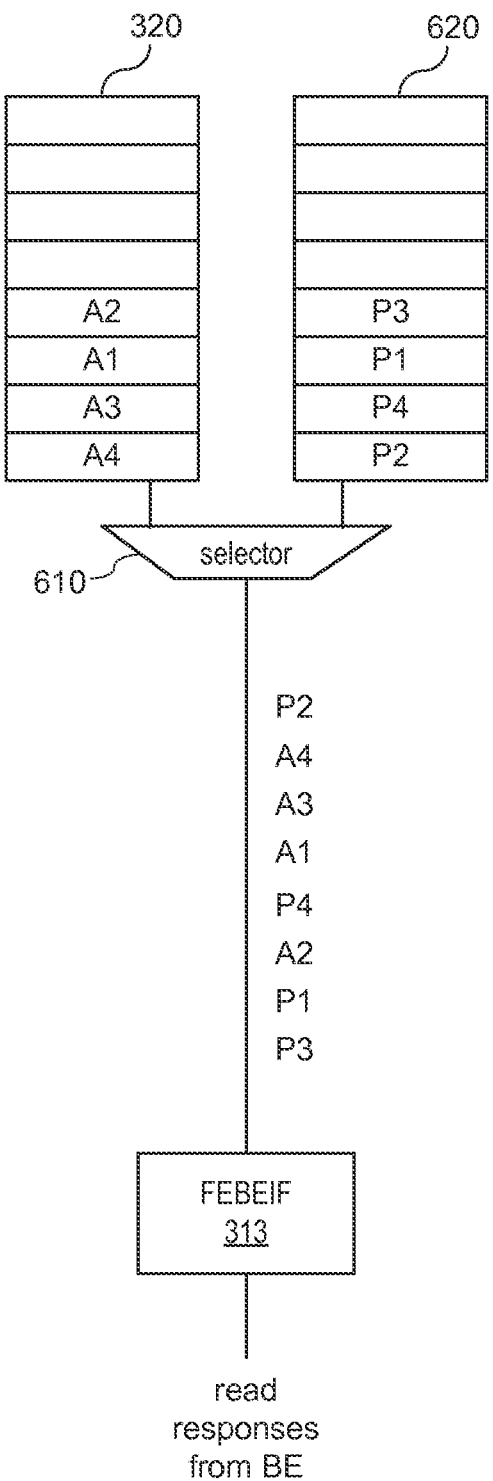
FIG. 6 is a conceptual diagram of read responses being distributed between a scatter-gather list (SGL) read response queue and a physical region page (PRP) read response queue.

FIG. 6 is a conceptual diagram of read responses being distributed between an SGL read response queue 320 and a PRP read response queue 620. The selection of one of the queues 320, 620 is made by a selector 610, which is configured in data transfer unit 124, according to a data tag that is returned with the read response. The data tag is initially assigned by command processing unit 120 when read requests are generated from received SGL or PRP read commands, such that a read response having a data tag that is assigned by command processing unit 120 when issuing a read request for a received SGL read command, would be stored in read response queue 320, and read response having a data tag that is assigned by command processing unit 120 when issuing a read request for a received PRP read command, would be stored in read response queue 620.

The data tag for a read request also determines the location in the read cache configured in volatile memory 114 where the read data is stored. Accordingly, for SGL reads, SGL controller 220 of data transfer unit 124 initiates a DMA transfer of the read data from a location in the read cache corresponding to the data tag into a location in the host system memory as specified in an SGL descriptor. Similarly, for PRP reads, PRP controller 210 of data transfer unit 124 initiates a DMA transfer of the read data from a location in the read cache corresponding to the data tag into a location in the host system memory as specified in a PRP descriptor.

In the embodiments described above, a register array is used to track whether or not the contents of modified buffers 320, 520 have been read. It should be recognized that other types of arrays, including a flop-based array and a memory-based array, may be used instead of a register array. Further, buffers 320, 520 are illustrated with eight storage locations. In practice, the number of storage locations may be different and when the buffers are full, various techniques known in the art for managing the full buffer state may be implemented.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

I claim:

1. A data storage device comprising:
a non-volatile semiconductor storage device; and
a controller configured to:
responsive to receiving a read command, issue a plurality of read requests, to read data from the non-volatile semiconductor storage device,
store a plurality of read responses to the plurality of read requests in a queue in a first order according to a first basis, wherein the queue is a circular buffer having a write pointer, a read pointer, and a special read pointer associated therewith,
store data in a register array to track which locations in the buffer have been read;
read the plurality of read responses from the queue in a second order according to a second basis different from the first basis, with reference to the read pointer and the special read pointer, where the write pointer is advanced each time contents are written into the buffer, the read pointer is advanced to a next unread location in the buffer based on the data in the register array when oldest valid contents in the buffer are read, and the special read pointer is advanced when valid contents in the buffer, excluding the oldest valid contents, are read.

2. The data storage device of claim 1, wherein the valid contents of the buffer are located between the read pointer and the write pointer.

3. The data storage device of claim 1, wherein the controller is configured to advance the read pointer past multiple storage locations of the buffer synchronously with a reading of the oldest valid contents in the buffer.

4. The data storage device of claim 1, wherein the register array includes a plurality of registers, each of which corresponds to a storage location of the buffer.

5. The data storage device of claim 1, wherein the controller is configured to cause read data associated with the read responses to be stored into multiple memory locations of a connected host.

6. The data storage device of claim 1, wherein the first basis includes an order in which the plurality of read responses was received by the controller, and the second basis includes an order in which the plurality of read requests corresponding thereto was issued by the controller.

7. A data storage device comprising:
a non-volatile semiconductor storage device; and
a controller configured to:
responsive to receiving an SGL (scatter gather list) read command, issue first and second read requests in that order, to read data from the non-volatile semiconductor storage device, and
store read responses to the first and second read requests in a queue as they are received, wherein
the read response to the first read request is stored in the queue first in time and the read response to the second read request is stored in the queue second in time when the read responses to the first and second read requests are received in order,
the read response to the second read request is stored in the queue first in time and the read response to the first read request is stored in the queue second in time when the read responses to the first and second read requests are received out of order, and
the read response to the first read request is read from the queue first in time and the read response to the second read request is read from the queue second in time, regardless of the order in which the read responses to the first and second read requests are stored in the queue
the queue is a circular buffer having a write pointer, a read pointer, and a special read pointer associated therewith, the write pointer being advanced each time contents are written into the buffer, the read pointer being advanced to a next unread location in the buffer based on the data in the register array when oldest valid contents in the buffer are read, and the special read pointer being advanced when valid contents in the buffer, excluding the oldest valid contents, are read.

8. The data storage device of claim 7, wherein the controller is configured to issue multiple read requests including the first and second read requests to fully execute the SGL read command.

9. The data storage device of claim 7, wherein the valid contents of the buffer are located between the read pointer and the write pointer.

10. The data storage device of claim 9, wherein the controller is configured to track for each storage location in the buffer, whether or not the valid contents of the buffer in the corresponding storage location, have been read.

11. The data storage device of claim 10, wherein the controller is configured to advance the read pointer past multiple storage locations of the buffer synchronously with a reading of the oldest valid contents in the buffer.

12. The data storage device of claim 7, further comprising a register array including a plurality of registers, each of which corresponds to a storage location of the buffer, with which the controller tracks the reading of the read responses to the first and second read requests from the queue.

13. A method of processing a read command in a data storage device having a non-volatile semiconductor storage device, said method comprising:
responsive to receiving a read command, issuing a plurality of read requests, to read data from the non-volatile semiconductor storage device;
storing a plurality of read responses to the plurality of read requests in a queue in a first order according to a first basis, wherein the queue is a circular buffer having a write pointer, a read pointer, and a special read pointer associated therewith;
storing data in a register array to track which locations in the buffer have been read;

reading the plurality of read responses from the queue in a second order according to a second basis different from the first basis, with reference to the read pointer and the special read pointer, where the write pointer is advanced each time contents are written into the buffer, the read point is advanced to a next unread location in the buffer based on the data in the register array when oldest valid contents in the buffer are read, and the special read pointer is advanced when valid contents in the buffer, excluding the oldest valid contents, are read.

14. The method of claim 13, wherein the valid contents of the buffer are located between the read pointer and the write pointer.

15. The method of claim 13, further comprising:
advancing the read pointer past multiple storage locations of the buffer synchronously with a reading of the oldest valid contents in the buffer.

16. The method claim 13, wherein the register array includes a plurality of registers, each of which corresponds to a storage location of the buffer.

17. The method of claim 13, further comprising:
storing read data associated with the read responses into multiple memory locations of a connected host.

18. The method of claim 17, wherein the read command is an SGL (scatter gather list) read command.

19. The method of claim 13, wherein the first basis includes an order in which the read responses was received in response to the plurality of read requests, and the second basis includes an order in which the plurality of read requests corresponding thereto was issued.

* * * * *